(12) United States Patent
Moffitt et al.

(10) Patent No.: US 10,479,421 B2
(45) Date of Patent: Nov. 19, 2019

(54) PROTECTION SYSTEM FOR A WORK VEHICLE

(71) Applicant: CNH Industrial America LLC, New Holland, PA (US)

(72) Inventors: John M. Moffitt, Wichita, KS (US); Timothy A. Hinkle, Wichita, KS (US); Quinton J. Berggren, Wichita, KS (US)

(73) Assignee: CNH Industrial America LLC, New Holland, PA (US)

( * ) Notice: Subject to any disclaimer, the term of this patent is extended or adjusted under 35 U.S.C. 154(b) by 6 days.

(21) Appl. No.: 15/392,969

(22) Filed: Dec. 28, 2016

(65) Prior Publication Data

US 2018/0178857 A1     Jun. 28, 2018

(51) Int. Cl.
| | |
|---|---|
| *B62D 33/06* | (2006.01) |
| *B60R 21/11* | (2006.01) |
| *B62D 33/063* | (2006.01) |
| *B62D 27/02* | (2006.01) |
| *B62D 27/06* | (2006.01) |

(Continued)

(52) U.S. Cl.
CPC ....... *B62D 33/0617* (2013.01); *B60Q 1/0005* (2013.01); *B60Q 1/24* (2013.01); *B60Q 3/76* (2017.02); *B60R 21/11* (2013.01); *B62D 27/02* (2013.01); *B62D 27/06* (2013.01); *B62D 33/063* (2013.01); *B66F 9/07545* (2013.01); *E02F 9/163* (2013.01)

(58) Field of Classification Search
CPC .. B62D 33/0617; B62D 27/02; B62D 33/063; B62D 27/06; B60Q 1/0005; B60Q 1/24; B60Q 3/0286; B60R 21/11

USPC .................................................... 296/190.03
See application file for complete search history.

(56) References Cited

U.S. PATENT DOCUMENTS

| | | |
|---|---|---|
| 3,690,720 A | 9/1972 | Whisler |
| 3,976,323 A | 8/1976 | Godfrey |
| | (Continued) | |

FOREIGN PATENT DOCUMENTS

| | | |
|---|---|---|
| CN | 1760478 A | 4/2006 |
| DE | 3602762 A1 | 8/1987 |
| | (Continued) | |

OTHER PUBLICATIONS

CustomWorks by Paladin; "Forestry Guarding for Case SSL/CTL"; Division of IES,Ooltewah, TN; www.paladinattachments.com.

(Continued)

*Primary Examiner* — Pinel E Romain
(74) *Attorney, Agent, or Firm* — Peter K. Zacharias; Patrick M. Sheldrake

(57) ABSTRACT

A protection system for a work vehicle includes a rear portion configured to couple to a chassis of the work vehicle and a top portion configured to couple to a cab of the work vehicle. The top portion is also configured so that at least part of the top portion is positioned above the cab of the work vehicle relative to a ground surface. In addition, a first height of a maximum vertical extent of the top portion relative to the ground surface is substantially equal to a second height of a maximum vertical extent of the rear portion relative to the ground surface. Further, the rear portion and the top portion are separated from one another while the rear portion is coupled to the chassis and the top portion is coupled to the cab.

20 Claims, 8 Drawing Sheets

(51) Int. Cl.
    *B60Q 1/24*     (2006.01)
    *B60Q 1/00*     (2006.01)
    *B66F 9/075*     (2006.01)
    *E02F 9/16*     (2006.01)
    *B60Q 3/76*     (2017.01)

(56) References Cited

U.S. PATENT DOCUMENTS

| | | | |
|---|---|---|---|
| 4,401,179 A | 8/1983 | Anderson | |
| 6,189,955 B1* | 2/2001 | Fryk | B60Q 1/0035 296/190.08 |
| 6,641,355 B1* | 11/2003 | McInerney | B66F 9/0655 180/211 |
| 6,910,731 B2 | 6/2005 | Albright et al. | |
| 7,909,389 B2 | 3/2011 | Bell et al. | |
| 7,975,793 B1* | 7/2011 | Claas | B60N 2/24 180/89.13 |
| 2016/0122973 A1* | 5/2016 | Lyle | E02F 3/301 414/687 |
| 2018/0094404 A1* | 4/2018 | Paolini | E02F 9/166 |

FOREIGN PATENT DOCUMENTS

| | | |
|---|---|---|
| EP | 0909855 A2 | 4/1999 |
| EP | 3020873 A2 | 5/2016 |
| JP | H0718700 A | 1/1995 |
| JP | H08151665 A | 6/1996 |
| JP | 2007255122 A | 10/2007 |

OTHER PUBLICATIONS

CustomWorks by Paladin; Product Manual Top Guard Kit Case—90Hp T4f SSL & CTL W28190040; Akron, OH.
CustomWorks by Paladin; Product Manual SSL Sweeps Case—90Hp T4f SSL & CTL W28190070; Ooltewah, TN; www.paladinattachments.com.
Extended European Search Report for EP17209845, dated May 24, 2018, 8 pages.

* cited by examiner

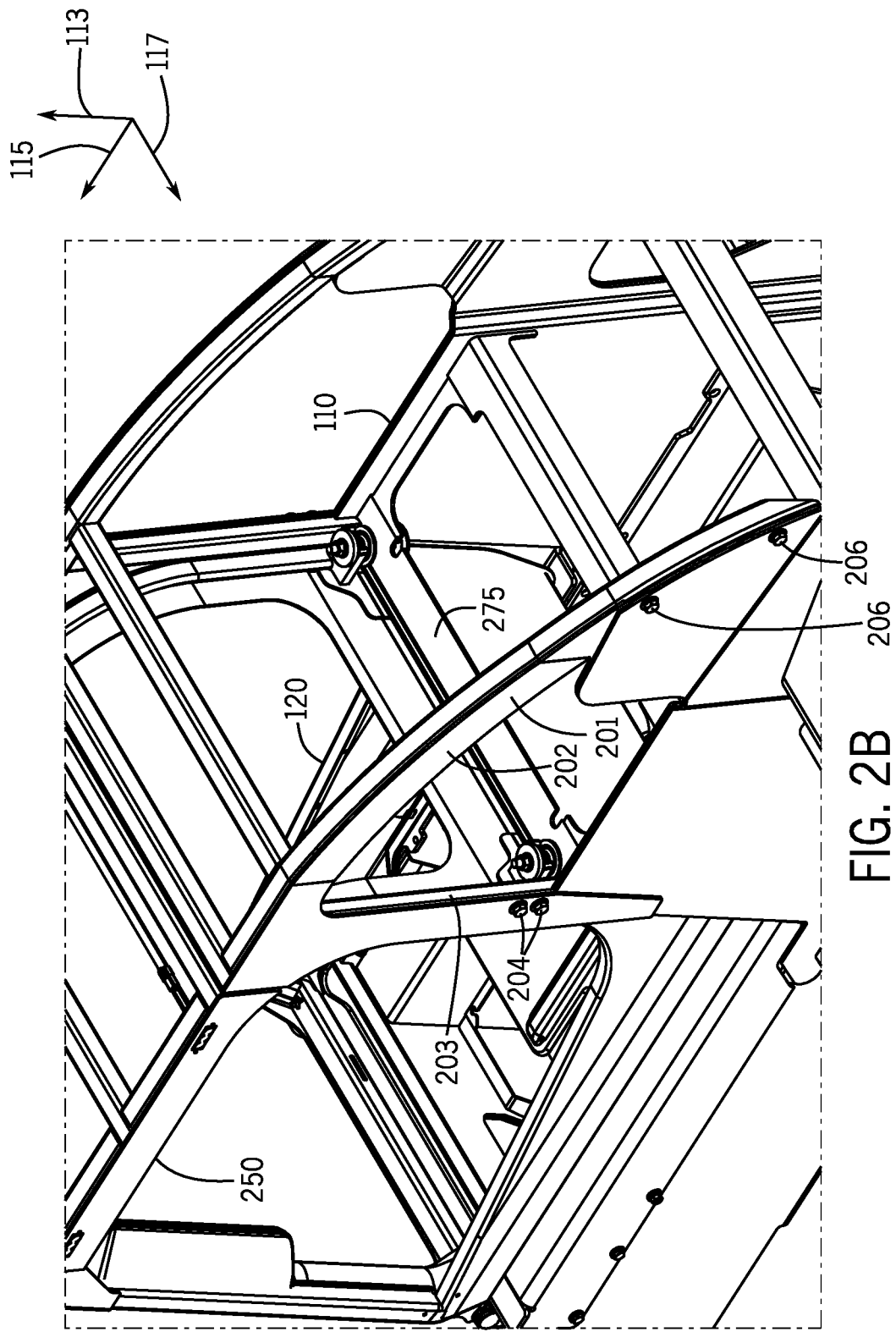

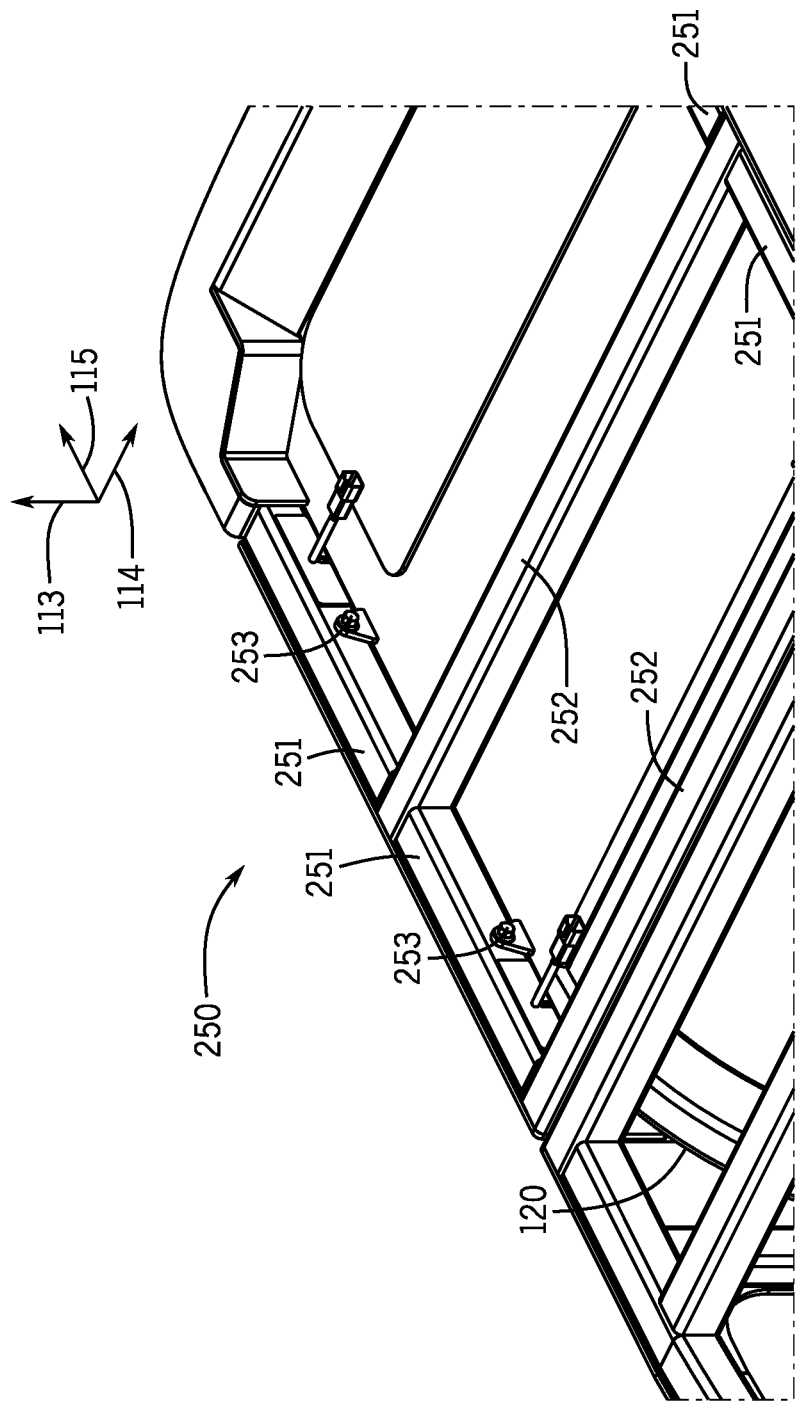

US 10,479,421 B2

PROTECTION SYSTEM FOR A WORK VEHICLE

BACKGROUND

The present disclosure relates generally to a protection system for a work vehicle.

Certain work vehicles (e.g., tractors, harvesters, skid steers, etc.) include a cab configured to house an operator. To facilitate access to certain components of the work vehicle (e.g., the engine, transmission, etc.), the cab may rotate forwardly relative to a chassis of the work vehicle about a pivot joint. In addition, the work vehicle may include certain elements configured to block falling objects from impacting the cab. For example, these elements often include rigid elements disposed above the work vehicle. However, due to the rigid nature of these elements, it may be difficult and/or time consuming to rotate the cab forward. For example, certain rigid elements may be removed to facilitate rotation of the cab.

BRIEF DESCRIPTION

In one embodiment, a protection system for a work vehicle includes a rear portion configured to couple to a chassis of the work vehicle. The protection system also includes a top portion configured to couple to a cab of the work vehicle such that at least part of the top portion is positioned above the cab of the work vehicle relative to a ground surface, and a first height of a maximum vertical extent of the top portion relative to the ground surface is substantially equal to a second height of a maximum vertical extent of the rear portion relative to the ground surface. Further, the rear portion and the top portion are separated from one another while the rear portion is coupled to the chassis and the top portion is coupled to the cab.

In another embodiment, a protection system for a work vehicle includes a rear portion non-rotatably coupled to a chassis of the work vehicle. The protection system also includes a top portion coupled to a cab of the work vehicle such that at least part of the top portion is positioned above the cab of the work vehicle relative to a ground surface, and a first height of a maximum vertical extent of the top portion relative to the ground surface is substantially equal to a second height of a maximum vertical extent of the rear portion relative to the ground surface.

In a further embodiment, a protection system for a work vehicle includes a rear portion configured to non-rotatably couple to a chassis of the work vehicle. The protection system also includes a top portion configured to couple to a cab of the work vehicle such that at least part of the top portion is positioned above the cab of the work vehicle relative to a ground surface, and a first height of a maximum vertical extent of the top portion relative to the ground surface is substantially equal to a second height of a maximum vertical extent of the rear portion relative to the ground surface. Further, the protection system includes a coupling mechanism configured to selectively couple the rear portion to the top portion.

DRAWINGS

These and other features, aspects, and advantages of the present disclosure will become better understood when the following detailed description is read with reference to the accompanying drawings in which like characters represent like parts throughout the drawings, wherein:

FIG. 2B is a perspective view of the protection system of FIG. 2A, in which a rear portion is coupled to a chassis of the work vehicle;

FIG. 2C is a perspective view of the protection system of FIG. 2A, in which a top portion is coupled to a cab of the work vehicle;

DETAILED DESCRIPTION

Figure 1:
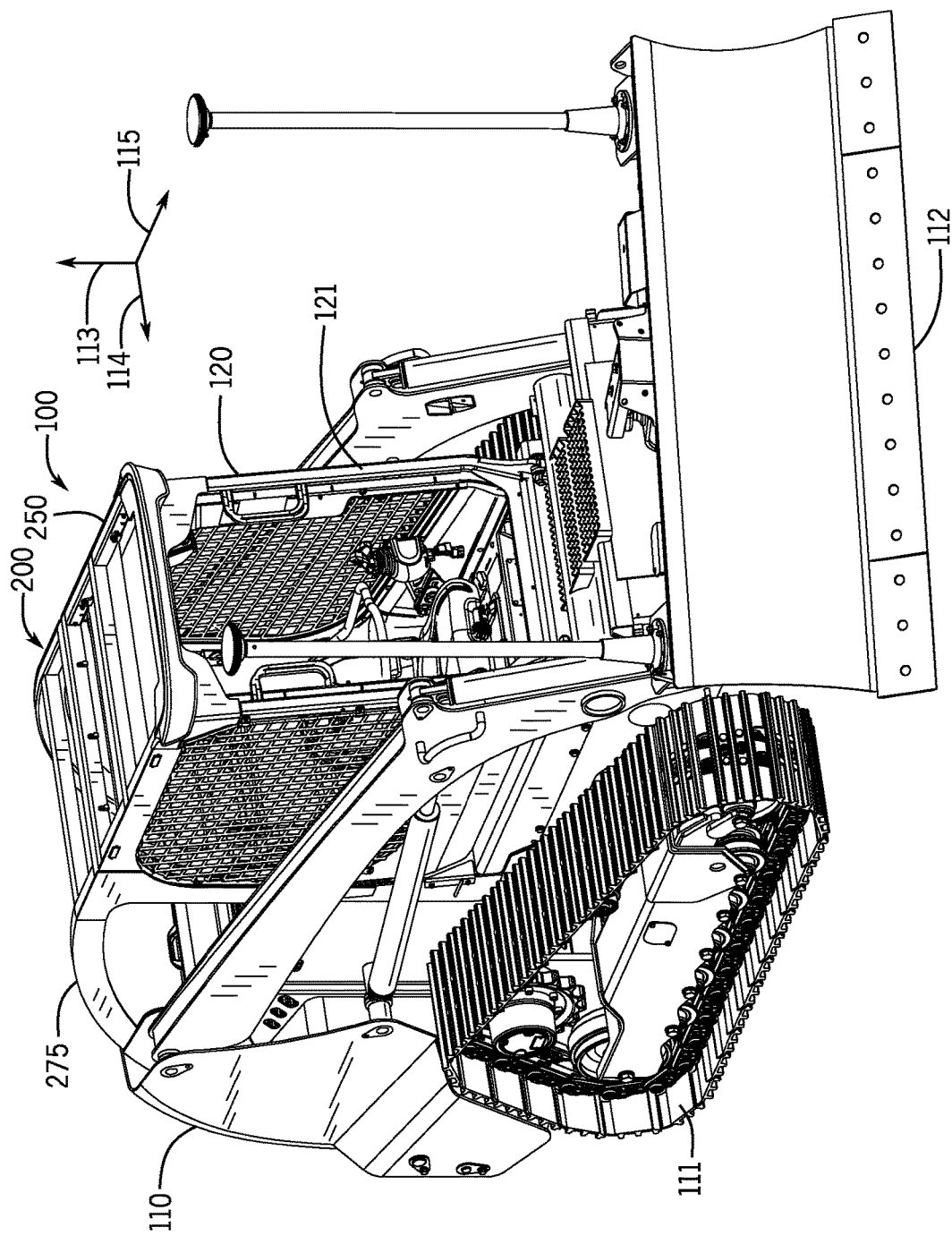
FIG. 1 is a perspective view of an embodiment of a work vehicle that includes a protection system.

Turning to the drawings, FIG. 1 is a perspective view of an embodiment of a work vehicle 100 that includes a protection system 200. In the illustrated embodiment, the work vehicle 100 is a skid steer. However, it should be appreciated that the protection system disclosed herein may be utilized on other work vehicles, such as bulldozers, on-road trucks, tractors, harvesters, and construction equipment, among other work vehicles. In the illustrated embodiment, the work vehicle 100 includes a cab 120 and a chassis 110. In certain embodiments, the chassis 110 is configured to house a motor (e.g., diesel engine, etc.), a hydraulic system (e.g., including a pump, valves, reservoir, etc.), and other components (e.g., an electrical system, a cooling system, etc.) that facilitate operation of the work vehicle. In addition, the chassis 110 is configured to support the cab 120 and tracks 111. The tracks 111 may be driven to rotate by the motor and/or by component(s) of the hydraulic system (e.g., hydraulic motor(s), etc.). While the illustrated work vehicle 100 includes tracks 111, it should be appreciated that in alternative embodiments, the work vehicle may include wheels or a combination of wheels and tracks.

The cab 120 is configured to house an operator of the work vehicle 100. Accordingly, various controls may be positioned within the cab 120 to facilitate operator control of the work vehicle 100. For example, the controls may enable the operator to control rotational speed of the tracks 111, thereby facilitating adjustment of the speed and/or the direction of the work vehicle 100. In addition, the controls may facilitate operator control of an implement, such as the illustrated blade 112. In the illustrated embodiment, the cab 120 also includes a door 121 configured to facilitate ingress and egress of the operator from the cab 120.

As discussed in detail below, the work vehicle 100 includes the protection system 200 configured to block falling objects from impacting the cab 120 and the chassis 110 of the work vehicle. For example, the protection system 200 may include a top portion 250 coupled to the cab 120 and a rear portion 275 coupled to the chassis 110. At least part of the top portion 250 is configured to be positioned above the cab 120 relative to the ground surface, and at least part of the rear portion 275 is configured to be positioned above the chassis 110 relative to the ground surface. Further, the top portion 250 and the rear portion 275 are configured to be separated from one another by a gap. The top portion 250 and the rear portion 275 may each include members disposed along a vertical axis 113, a lateral axis 114, a longitudinal axis 115, or a combination thereof, and/or angled relative to one or more of the axes.

Figure 2A:
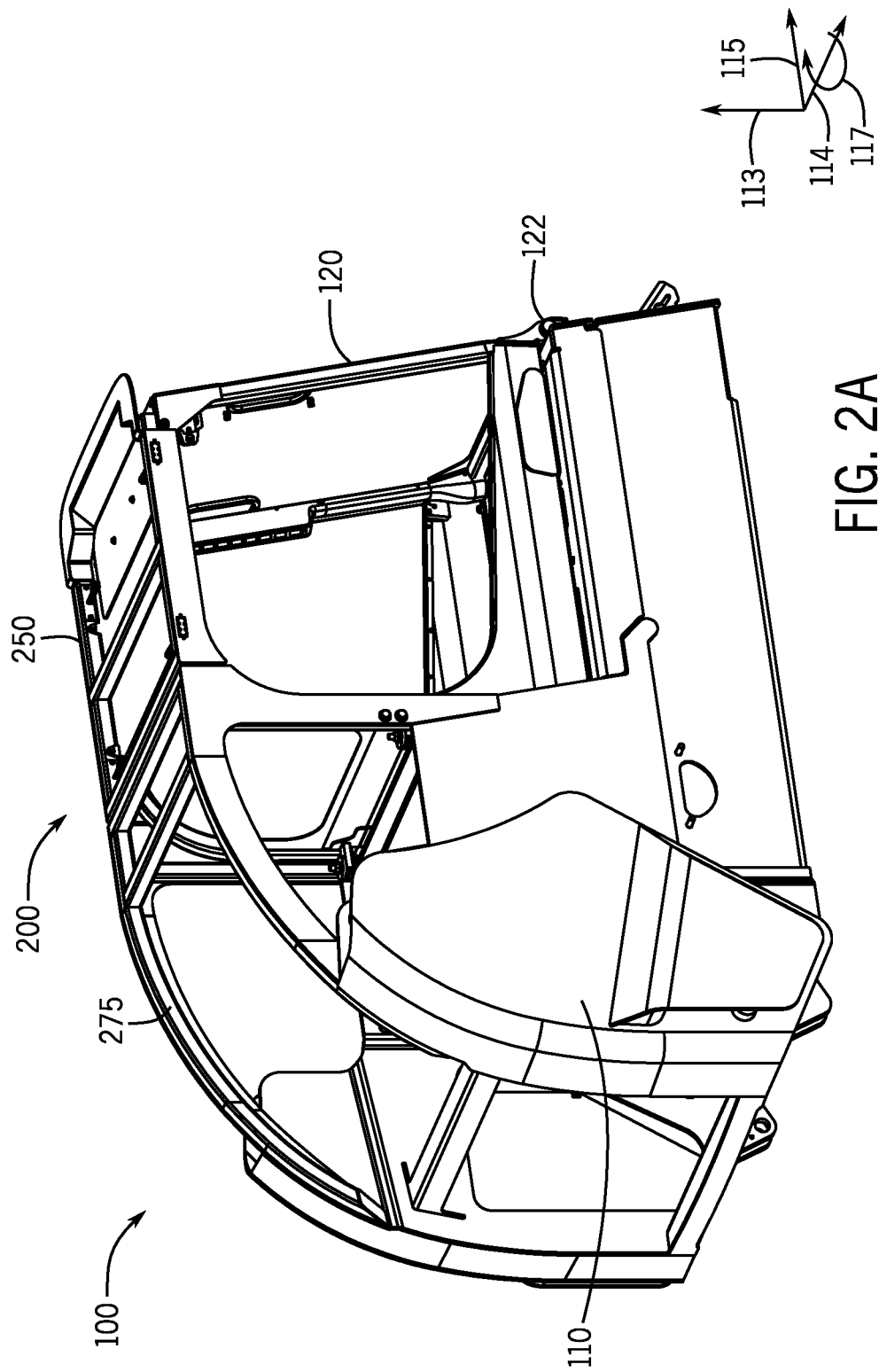
FIG. 2A is a perspective view of an embodiment of a protection system that may be used on the work vehicle of FIG. 1.

FIG. 2A is a perspective view of an embodiment of a protection system 200 that may be used on the work vehicle 100 of FIG. 1. In the illustrated embodiment, the protection system 200 includes the rear portion 275 rigidly and non-rotatably coupled to the chassis 110 and the top portion 250 rigidly and non-rotatably coupled to the cab 120. However, it should be appreciated that, in alternative embodiments, the protection system may include multiple rear portions 275 and/or multiple top portions 250. Further, other embodiments may include only the rear portion 275 or only the top portion 250. In the illustrated embodiment, the rear portion 275 and the top portion 250 are separate from one another. Accordingly, the protection system 200 enables the cab 120 to rotate about the lateral axis 114 in pitch 117 via a pin joint 122. The protection system 200 is configured to block falling objects from impacting the cab 120 and/or the chassis 110. As such, the top portion 250 and the rear portion 275 include members disposed above the cab 120 and the chassis 110.

FIG. 2B is a perspective view of the protection system 200 of FIG. 2A, in which the rear portion 275 is coupled to the chassis 110 of the work vehicle 100. As illustrated, a vertical structural member 203 extends substantially along the vertical axis 113 (i.e. at an angle 30 degrees or less with respect to the vertical axis 113) and couples to a curved structural member 201 (e.g., by bolts or welds). However, in alternative embodiments, the curved structural member 201 may include a straight structural member, or multiple straight structural members. Further, an outer panel 202 couples (e.g., by bolts or welds) to both the vertical structural member 203 and the curved structural member 201. However, it should be appreciated that the vertical structural member 203 and the curved structural member 201 may be a single member in certain embodiments. In the present embodiment, the outer panel 202 is coupled to the vertical structural member 203 by bolts 204, and the outer panel 202 is coupled to the curved structural member by bolts 206. Further, the rear portion 275 is coupled to the chassis 110 on one end by bolts 206 that pass through the curved structural member 201 and the outer panel 202. The rear portion 275 is coupled to the chassis 110 at the other end by welding the vertical structural member 203 and/or the outer panel 202 to the chassis 110. It should be appreciated that in addition or as an alternative to the bolts 206, the rear portion 275 may be coupled to the chassis 110 by any suitable coupling system, such as welding. As previously discussed, the bolts 204 couple the outer panel 202 to the vertical structural member 203; however, the bolts 204 may also pass through a portion of the chassis 110, thereby coupling the outer panel 202 and the vertical structural member 203 to the chassis 110.

FIG. 2C is a perspective view of the protection system 200 of FIG. 2A, in which the top portion 250 is coupled to the cab 120 of the work vehicle 100. In the illustrated embodiment, the top portion 250 includes longitudinal structural members 251 oriented substantially along the longitudinal axis 115 and lateral structural members 252 oriented substantially along the lateral axis 114. As used herein, substantially along an axis refers to an angle relative to the respective axis of between 0 degrees and 45 degrees, between 0 degrees and 30 degrees, between 0 degrees and 15 degrees, between 0 degrees and 5 degrees, or between 0 degrees and 2 degrees. By further example, the angle between the element and the axis may be less than 5 degrees, less than 4 degrees, less than 3 degrees, less than 2 degrees, or less than 1 degree. Further, while the illustrated embodiment includes two lateral structural members 252 oriented substantially along the lateral axis 114, it should be appreciated that the top portion 250 may include any suitable number of lateral structural members 252 (e.g., 1, 2, 3, 4, 5, 6, or more) extending substantially along the lateral axis 114. Also, while the illustrated embodiment includes four longitudinal structural members 251 extending substantially along the longitudinal axis 115, it should be appreciated that the top portion 250 may include any suitable number of members (e.g., 1, 2, 3, 4, 5, 6, or more) extending substantially along the longitudinal axis 115. Although the present embodiment includes longitudinal structural members 251 and lateral structural members 252 at approximately 90 degrees relative to one another, it should be appreciated that the longitudinal structural members 251 and the lateral structural members 252 may be at any suitable angle relative to one another, including 5 degrees, 10 degrees, 20 degrees, 30 degrees, 40 degrees, 50 degrees, 60 degrees, 70 degrees, 80 degrees, 90 degrees, or any suitable angle in between. In the present embodiment, the top portion 250 is coupled to the cab 120 at the longitudinal structural members 251 by fasteners 253. However, it should be appreciated that other fastening systems (e.g., welding) may be used in alternative embodiments (e.g., in addition or as an alternative to the fasteners 253). Further, lateral structural members 252 are coupled to longitudinal structural members 251 by welding, but other fastening systems may be used (e.g., fasteners 253) in alternative embodiments. Alternative embodiments may also include more or fewer fasteners (e.g., 1, 2, 3, 4, 5, 6, or more).

Figure 2D:
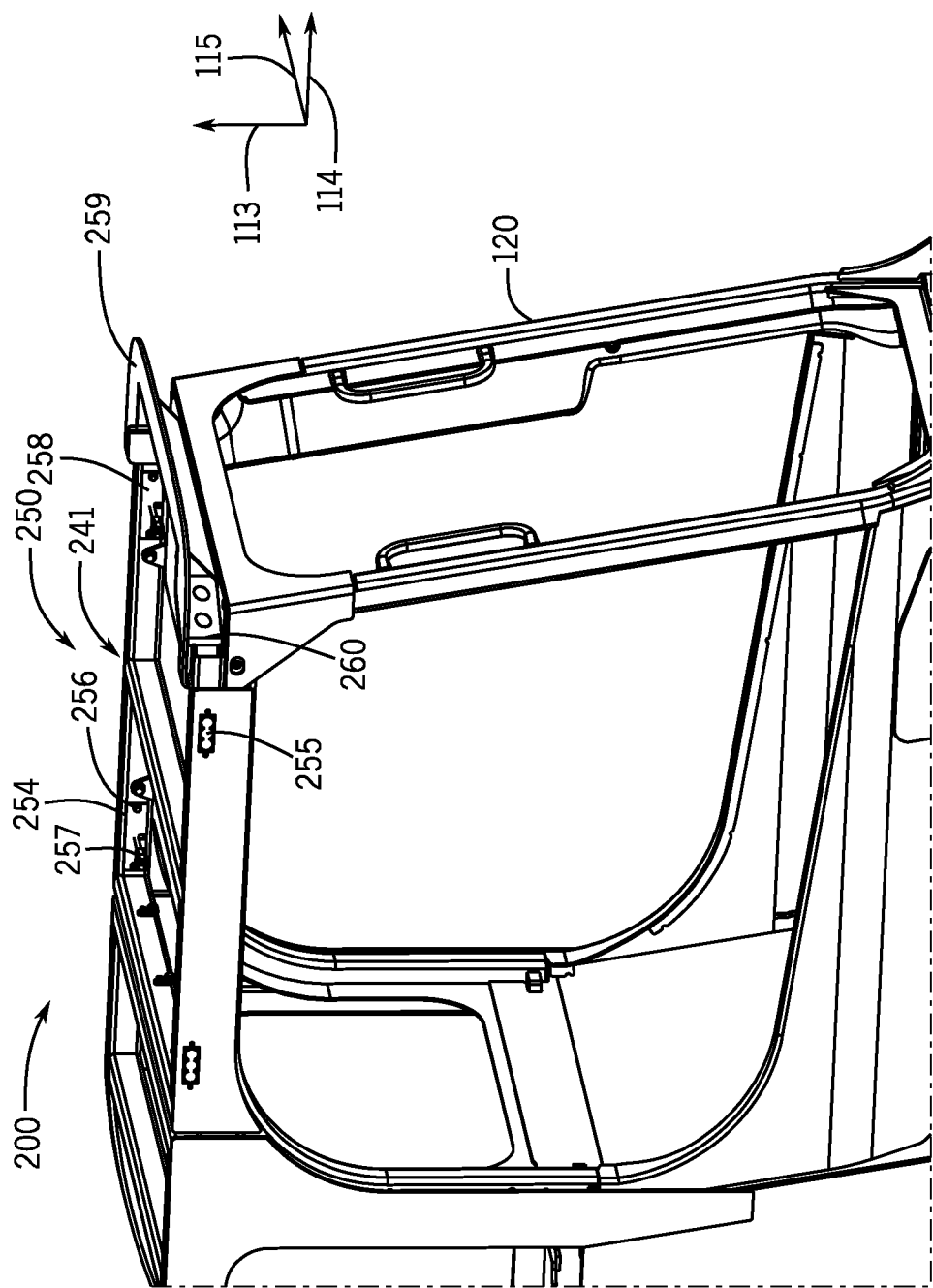
FIG. 2D is a perspective view of the protection system of FIG. 2A, in which light assemblies are coupled to the top portion, and an overhang extends over a lighting system.

FIG. 2D is a perspective view of the protection system of FIG. 2A, in which light assemblies 254 are coupled to a frame 241 of the top portion 250, and an overhang 259 extends over a lighting system 260. In the illustrated embodiment, light assemblies 254 are coupled to the frame 241 of the top portion 250 via respective brackets 258 and fasteners 256. The frame 241 is formed by the longitudinal structural members 251 and the lateral structural members 252 described above. While the brackets 258 and fasteners 256 couple the light assemblies to the frame 241 in the illustrated embodiment, it is envisioned that any suitable coupling mechanism (e.g., bolts or welding) may be utilized (e.g., in addition to the brackets 258 and fasteners 256, or as an alternative to the brackets 258 and fasteners 256) in alternative embodiments. Further, each light assembly 254 includes a wiring assembly 257 that electrically couples a respective light 255 to a power source, such as a battery, a generator, or any other suitable type of power source. In addition, while the present embodiment includes four light assemblies 254, it should be appreciated that in alternative embodiments, the top portion 250 may include more or fewer light assemblies (e.g., 1, 2, 3, 4, 5, 6, or more). In certain applications, the work vehicle 100 may operate in low light conditions. Work vehicles 100 operating under these conditions may benefit from light assemblies 254 illuminating the area around the work vehicle 100. Further, the light assemblies 254 may make the work vehicle 100 more visible in low light conditions.

The top portion 250 also includes an overhang 259 disposed above a lighting system 260 relative to the ground surface. In the present embodiment, the overhang 259 is positioned at one longitudinal end of the top portion 250; however, it should be appreciated that, in alternative embodiments, the overhang 259 may be positioned over some or all of the top portion 250. The overhang 259 may block falling objects from impacting the lighting system 260. In embodiments that include an overhang 259 positioned over additional parts of the top portion 250, the overhang 259 may block falling objects from impacting some or all of the light assemblies 254. Further, the overhang 259 may couple to the frame 241 by any suitable connection (e.g., by bolts or welds). In addition or as an alternative, the overhang 259 may couple to the cab 120 by any suitable connection (e.g., by bolts or welds). Further, the overhang 259 may be omitted in certain embodiments.

Figure 2E:
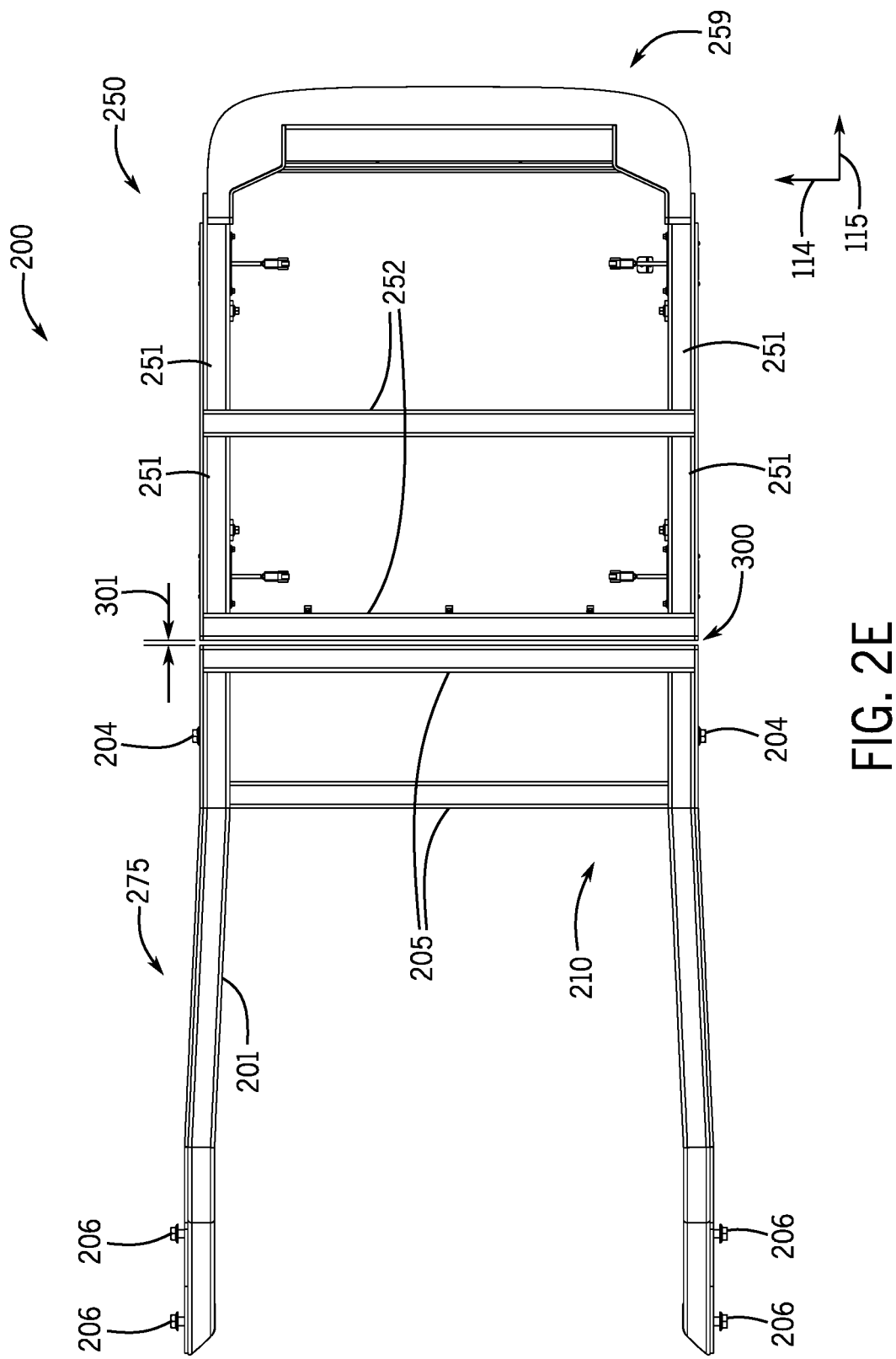
FIG. 2E is a top view of the protection system of FIG. 2A.

FIG. 2E is a top view of the protection system 200 of FIG. 2A. As illustrated, the rear portion 275 includes lateral structural members 205 oriented substantially along the lateral axis 114. In the present embodiment, the lateral structural members 205 are coupled to the curved structural members 201. The lateral structural members 205 may be coupled to the curved structural members 201 by any suitable connection, including welds and/or bolts. It should be noted that, in alternative embodiments, the lateral structural members 205 may couple to other parts of the rear portion 275, including the vertical structural members 203. Also, the present embodiment includes two lateral structural members 205, but other embodiments may include any suitable number of lateral structural members 205 (e.g., 1, 2, 3, 4, 5, 6, or more). The frame 210 is formed by combination of the lateral structural members 205, the vertical structural members 203, the curved structural members 201, and the outer panel 202. In the present embodiment, the curved structural members 201, the vertical structural members 203, and the lateral structural members 205 are tubes; however, it should be appreciated that the structural members may include any suitable structure, including plates and bars, among other elements. Further, the bolts 204 and the bolts 206 are disposed at opposite longitudinal sides of the rear portion 275. The two sets of bolts 204 are disposed at opposite lateral sides of the rear portion 275, and the two sets of bolts 206 are disposed at opposite lateral sides of the rear portion 275. In the present embodiment, the bolts 204, in addition to welds, couple the vertical structural members 203 to the outer panels 202. The bolts 206 couple the curved structural member 201, the outer panel 202, and the chassis 110 one another.

The top portion 250 includes the longitudinal structural members 251, the lateral structural members 252, and the overhang 259. In the present embodiment, the longitudinal structural members 251 and the lateral structural members are tubes; however, it should be appreciated that the structural members may include any suitable structure, including plates and bars, among other elements. Furthermore, as previously discussed, the rear portion 275 and the top portion 250 are separate from one other by a gap 300. The gap 300 extends substantially along the lateral axis 114. The gap 300 enables the rear portion 275 and the top portion 250 to freely move relative to one another. For example, the gap 300 enables the cab 120, which the top portion 250 is coupled to, to rotate forward about the lateral axis 114 without decoupling of the rear portion 275 and the top portion 250. Further, the width 301 of the gap 300 may be any suitable distance, including 1 centimeters ("cm"), 2 cm, 5 cm, or 10 cm, or more. The width 301 may or may not be constant across the lateral length of the gap 300.

Figure 2F:
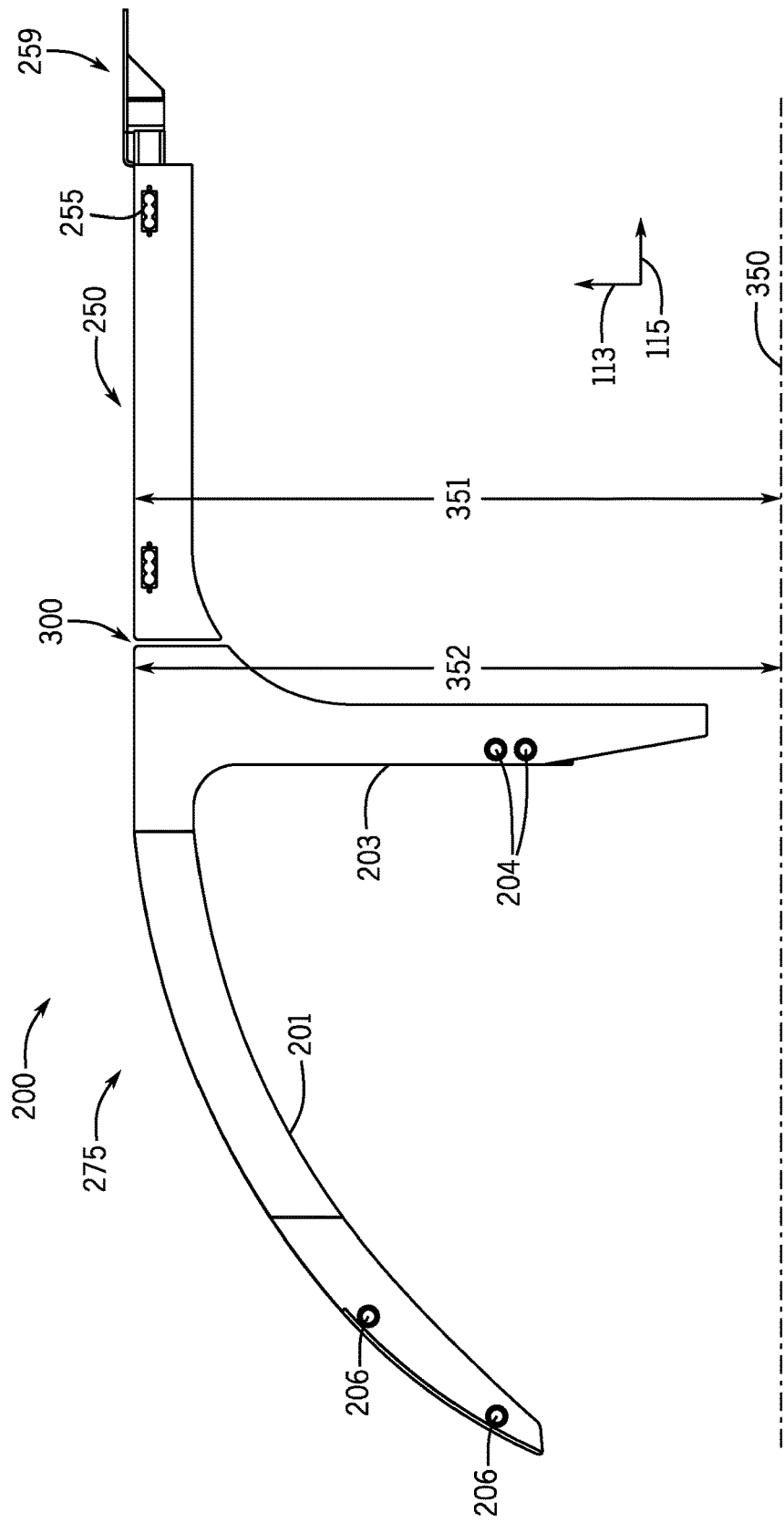
FIG. 2F is side view of the protection system of FIG. 2A.

FIG. 2F is a side view of the protection system of FIG. 2A. In the present embodiment a first height 352 of a maximum vertical extent of the rear portion 275 with respect to a ground surface 350 is substantially equal to a second height 351 of a maximum vertical extent of the top portion 250 with respect to the ground surface 350. The ground surface 350 may be parallel to a plane formed by the lateral axis 114 and the longitudinal axis 115. As used herein, substantially equal refers to a height difference of less than 1 cm, 2 cm, 5 cm, or 10 cm. While the maximum vertical extents of the rear portion 275 and the top portion 250 have substantially equal heights 351, 352 in the illustrated embodiment, it should be appreciated that the maximum vertical extent of the rear portion 275 may be higher or lower than the maximum vertical extent of the top portion 250 in alternative embodiments.

Figure 3:
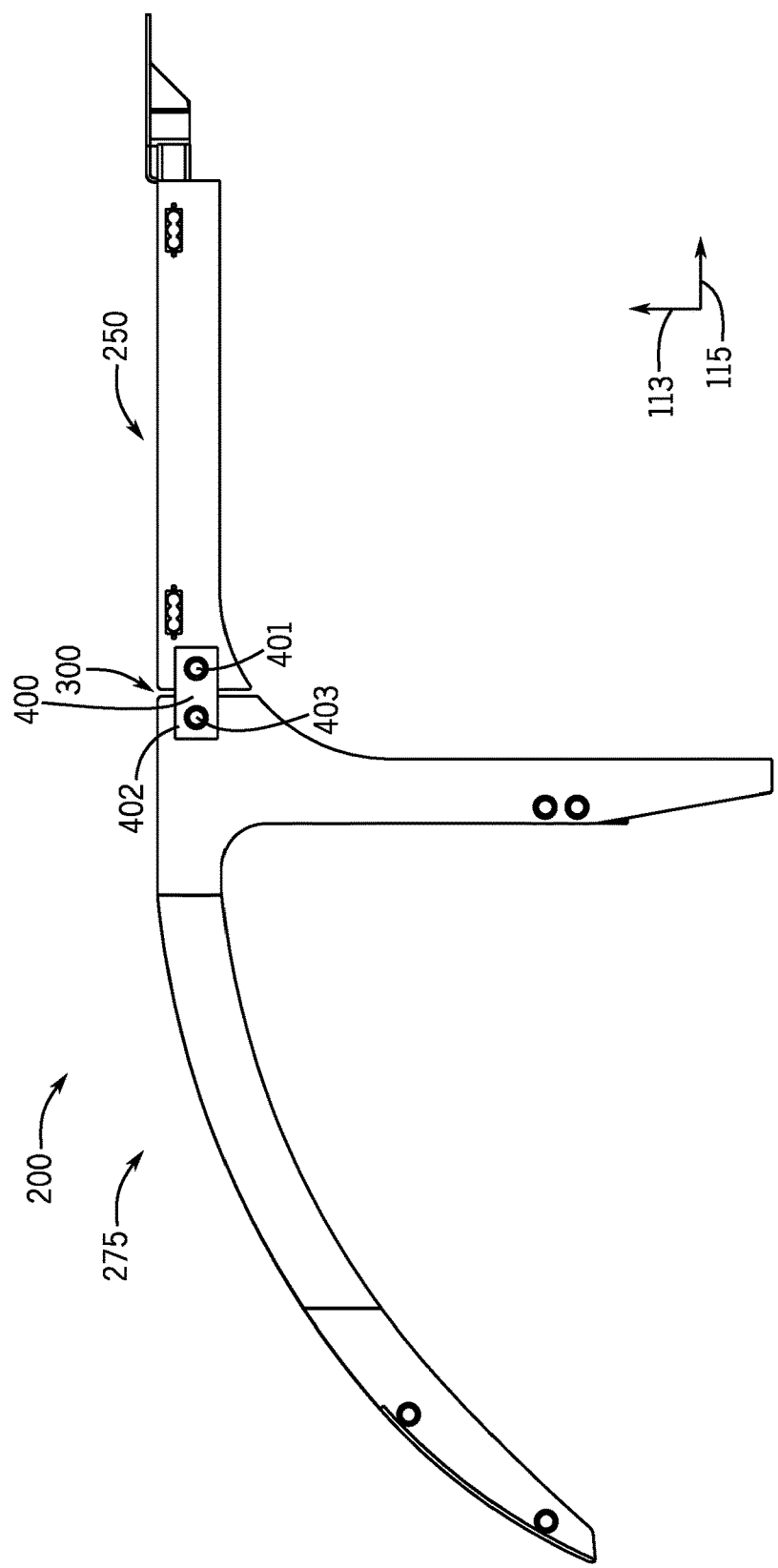
FIG. 3 is a side view of the protection system of FIG. 2A, including an embodiment of a coupling mechanism.

FIG. 3 is a side view of the protection system 200 of FIG. 2A, including an embodiment of a coupling mechanism 400. In the illustrated embodiment, the coupling mechanism 400 includes a pin 401, a pin 403, and a plate 402. The coupling mechanism 400 is configured to selectively couple the rear portion 275 to the top portion 250. It should be appreciated that, in alternative embodiments, the coupling mechanism 400 may include another suitable device, such as a latch, a lock, a clamp, among others. It should be appreciated that the coupling mechanism 400 may be disposed at any location along the gap 300. Further, in the illustrated embodiment, the plate 402 is coupled rotatably or non-rotatably to the rear portion 275 and/or the top portion 250. The pin 401 couples the plate 402 to the top portion 250, and the pin 403 couples the plate 402 to the rear portion 275. The pin 401 may be uncoupled from top portion 250 through user interaction, thereby uncoupling the top portion 250 from the rear portion 275. The pin 403 may be uncoupled from the rear portion 275 through user interaction, thereby uncoupling the top portion 250 from the rear portion 275. Fasteners, such as the pin 401 and the pin 403, may be toolless fasteners. As such, the pin 401 and the pin 403 may be uncoupled without the use of any tools.

While only certain features have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A protection system for a work vehicle, comprising:
a rear portion non-rotatably coupled to a chassis of the work vehicle;
a top portion coupled to a cab of the work vehicle such that at least part of the top portion is positioned above the cab of the work vehicle relative to a ground surface;
wherein a first height of a maximum vertical extent of the top portion relative to the ground surface is substantially equal to a second height of a maximum vertical extent of the rear portion relative to the ground surface.

2. The protection system of claim 1, wherein the rear portion is configured to be non-rotatably coupled to the chassis by at least one fastener.

3. The protection system of claim 1, wherein the rear portion remains non-rotatably coupled to the chassis while the cab of the work vehicle is rotated about a lateral axis.

4. The protection system of claim 1, wherein the rear portion is separated from the front portion by a gap extending along a lateral axis.

5. The protection system of claim 1, wherein the top portion comprises a light assembly coupled to a frame of the top portion.

6. The protection system of claim 1, wherein the top portion comprises a plurality of structural members, at least one of the plurality of structural members extends substantially along a longitudinal axis, and at least one of the plurality of structural members extends substantially along a lateral axis.

7. The protection system of claim 1, wherein rear portion comprises at least one substantially vertical structural member and at least one curved structural member extending from the at least one substantially vertical structural member.

8. A protection system for a work vehicle, comprising:
a rear portion configured to non-rotatably couple to a chassis of the work vehicle;
a top portion configured to couple to a cab of the work vehicle such that at least part of the top portion is positioned above the cab of the work vehicle relative to a ground surface, and a first height of a maximum vertical extent of the top portion relative to the ground surface is substantially equal to a second height of a maximum vertical extent of the rear portion relative to the ground surface; and
a coupling mechanism configured to selectively couple the rear portion to the top portion.

9. The protection system of claim 8, wherein the coupling mechanism comprises a plate and a pin or bolts.

10. The protection system of claim 8, wherein the coupling mechanism comprises a toolless fastener.

11. The protection system of claim 8, wherein the top portion comprises a light assembly coupled to a frame of the top portion.

12. The protection system of claim 8, wherein the top portion comprises a plurality of structural members, at least one of the plurality of structural members extends substantially along a longitudinal axis, and at least one of the plurality of structural members extends substantially along a lateral axis.

13. The protection system of claim 8, wherein rear portion comprises at least one substantially vertical structural member and at least one curved structural member extending from the at least one substantially vertical structural member.

14. A work vehicle, comprising:
a cab;
a chassis; and
a protection system comprising:
a rear portion non-rotatably coupled to the chassis; and
a top portion coupled to the cab such that at least part of the top portion is positioned above the cab relative to a ground surface,
wherein a first height of a maximum vertical extent of the top portion relative to the ground surface is substantially equal to a second height of a maximum vertical extent of the rear portion relative to the ground surface.

15. The work vehicle of claim 14, wherein the rear portion is configured to be non-rotatably coupled to the chassis by at least one fastener.

16. The work vehicle of claim 14, wherein the rear portion remains non-rotatably coupled to the chassis while the cab is rotated about a lateral axis.

17. The work vehicle of claim 14, wherein the rear portion is separated from the front portion by a gap extending along a lateral axis.

18. The work vehicle of claim 14, wherein the top portion comprises a light assembly coupled to a frame of the top portion.

19. The work vehicle of claim 14, wherein the top portion comprises a plurality of structural members, at least one of the plurality of structural members extends substantially along a longitudinal axis, and at least one of the plurality of structural members extends substantially along a lateral axis.

20. The work vehicle of claim 14, wherein rear portion comprises at least one substantially vertical structural member and at least one curved structural member extending from the at least one substantially vertical structural member.

* * * * *